(12) United States Patent
Schmitz

(10) Patent No.: US 6,654,548 B2
(45) Date of Patent: Nov. 25, 2003

(54) METHOD AND APPARATUS FOR CONTROLLING THE SPEED OF ROTATION OF A DIRECT CURRENT MOTOR FOR MODEL VEHICLES

(75) Inventor: Rainer Schmitz, Adelberg (DE)

(73) Assignee: Gebr. Maerklin & Cie. GmbH, Goeppingen (DE)

( * ) Notice: Subject to any disclaimer, the term of this patent is extended or adjusted under 35 U.S.C. 154(b) by 0 days.

(21) Appl. No.: 10/259,274

(22) Filed: Sep. 27, 2002

(65) Prior Publication Data

US 2003/0049023 A1 Mar. 13, 2003

Related U.S. Application Data

(63) Continuation of application No. PCT/EP02/00965, filed on Jan. 30, 2002.

(30) Foreign Application Priority Data

Jan. 30, 2001 (DE) ......................... 101 05 207

(51) Int. Cl.$^7$ ............................. H02P 7/00; H02P 5/17; H02P 7/29; H02P 7/06; G05B 11/28
(52) U.S. Cl. ..................... 388/825; 388/829; 388/811; 318/254; 318/138; 318/439; 318/599; 318/805; 318/811
(58) Field of Search .................. 388/825, 829, 388/831, 804, 811, 819, 928.1; 318/254, 138, 439, 599, 798, 805, 806, 811

(56) References Cited

U.S. PATENT DOCUMENTS

| | | | | |
|---|---|---|---|---|
| 3,629,633 A | * | 12/1971 | O'Callaghan | 310/94 |
| 3,732,478 A | * | 5/1973 | MacMullan | 318/616 |
| 4,591,767 A | * | 5/1986 | Koide | 388/813 |
| 4,866,356 A | | 9/1989 | Altendorf | |
| 4,952,834 A | * | 8/1990 | Okada | 310/316.02 |
| 5,055,708 A | * | 10/1991 | Sugawara | 318/254 |
| 5,207,520 A | * | 5/1993 | Tanaka | 388/804 |
| 5,448,141 A | * | 9/1995 | Kelley et al. | 318/254 |
| 5,502,361 A | * | 3/1996 | Moh et al. | 318/254 |
| 5,574,344 A | * | 11/1996 | Matsuoka et al. | 318/293 |
| 6,181,092 B1 | * | 1/2001 | Turner | 318/254 |
| 6,362,582 B1 | * | 3/2002 | Bernauer et al. | 318/254 |
| 6,497,267 B1 | * | 12/2002 | Azar et al. | 160/310 |

FOREIGN PATENT DOCUMENTS

| | | | |
|---|---|---|---|
| DE | 32 32 303 | 3/1984 | ......... A63H/19/24 |
| DE | 36 45 016 | 9/1988 | ............ H02P/7/29 |
| DE | 199 28 907 | 12/2000 | ......... H02K/17/06 |
| EP | 0 296 444 | 12/1988 | |
| EP | 0 373 357 | 6/1990 | ............ H02P/5/17 |

* cited by examiner

Primary Examiner—Robert E. Nappi
Assistant Examiner—Edgardo San Martin
(74) Attorney, Agent, or Firm—Barry R. Lipsitz

(57) ABSTRACT

The invention relates to a method for control of the speed of rotation of a separately excited direct current motor for model vehicles, the speed of rotation of the motor being controlled by means of a pulse sequence, the motor being alternately supplied with a supply voltage during a switch-on period and disconnected from the supply voltage during a switch-off period, the duration of the switch-off period being dependent on the deviation of an actual value from a set value for the speed of rotation of the motor. In order to further develop the method in such a way that the separately excited motor has a low noise output and stable control is possible over a wide range of speed of rotation, it is proposed that a pulse width modulated signal is provided, the pulse width of which is dependent on the average torque loading of the motor, and that the pulse width modulated signal is combined with the pulse sequence by an AND-operation. In addition, a control unit for carrying out the method is proposed as well as a decoder unit and a model vehicle comprising a control unit of this kind.

15 Claims, 2 Drawing Sheets

METHOD AND APPARATUS FOR CONTROLLING THE SPEED OF ROTATION OF A DIRECT CURRENT MOTOR FOR MODEL VEHICLES

This application is a continuation of international application number PCT/EP02/00965 filed on Jan. 30, 2002.

The present disclosure relates to the subject matter disclosed in international application No. PCT/EP02/00965 of Jan. 30, 2002, which is incorporated herein by reference in its entirety and for all purposes.

BACKGROUND OF THE INVENTION

The invention relates to a method for control of the speed of rotation of a separately excited direct current motor for model vehicles, the speed of rotation of the motor being controlled by means of a pulse sequence, the motor being alternately supplied with a supply voltage during a switch-on period and disconnected from the supply voltage during a switch-off period, the duration of the switch-off period being dependent on the deviation of an actual value from a set value for the speed of rotation of the motor.

The invention also concerns a control unit for control of the speed of rotation of a separately excited direct current motor for model vehicles for carrying out the method comprising an on-off controller for control of a switch element for alternate switch-on and switch-off of the direct current motor, the controller providing a series of pulses.

The invention further relates to a decoder unit for electrical model vehicles, in particular for vehicles for a model railway, having a control unit of this kind, as well as to a model vehicle, above all a model railway vehicle, having a separately excited direct current motor and a control unit of this kind.

Drive of electrical model vehicles, in particular electrical model railway vehicles, is frequently effected by means of separately excited direct current motors. If the required running properties of the model vehicles are to be assured, the speed of rotation of the motors must be capable of being controlled in a stable manner over a wide range. For this purpose, on-off controllers are generally used, by means of which a pulse sequence is provided for control of a switch element by which the motor can be supplied with a supply voltage. The voltage supply is effected by this during a switch-on period corresponding to the pulse sequence. The switch-on period may be preset to be fixed. During a switch-off period of the pulse sequence, the supply voltage is disconnected from the motor. The duration of the switch-off period is dependent on the deviation of the actual value from the set value for the speed of rotation of the motor. The actual value is determined by measurement of the induction voltage present at the armature winding of the motor during the switch-off period. This induction voltage is frequently also called "counter-EMF" (electromotive force). The higher the speed of rotation of the motor, the greater the induction voltage. This induction voltage is compared with an adjustable set value by means of the on-off controller, and according to the deviation of the actual value from the set value of the induction voltage and therefore from the desired speed of rotation of the motor, the switch-off period of the pulse sequence is extended or shortened.

A control method of this kind enables reliable control of the speed of rotation, especially in the slow speed range of the model vehicle. The noise output, which is inherent to the control principle is however disadvantageous, especially for high-grade motors, for example motors having bell-shaped armatures, the noise output being developed by the fixed preset switch-on period and the variable switch-off period. Especially for motors having bell-shaped armatures, the on-off control mentioned leads to mechanical vibrations in the range of several kHz, thus in the range of greatest hearing sensitivity.

In order to control the speed of rotation of separately excited direct current motors, PID-controllers may also be used in combination with a pulse width generator. In this case, the direct current motor is cyclically controlled by means of a pulse width modulated signal, the induction voltage (counter-EMF) of the motor being determined in the current-free condition of the motor and the pulse width generator then being controlled by means of the PID-controller in accordance with the deviation of the actual value from the set value for the speed of rotation of the motor, in order to generate the pulse width modulated signal. The disadvantage in the case of this method of control is to be seen in particular in that the parameters required for the PID-controller are to be determined only with difficulty. Especially in the slow speed range of the model vehicles, it has proven to be very difficult to optimize these parameters in such a manner that control instabilities are reliably avoided over as wide a control range as possible.

It is an object of the present invention to provide a method of the generic kind for control of the speed of rotation of a separately excited direct current motor for model vehicles which results in only a low level of noise output for the direct current motor and enables stable control over a wide range of speeds of rotation.

SUMMARY OF THE INVENTION

This object is met according to the invention in the case of a method of the kind mentioned at the beginning by a pulse width modulated signal being provided, the pulse width of which is dependent on the average torque loading of the motor, and by the pulse width modulated signal being combined with the pulse sequence by an AND-operation.

The method according to the invention combines the advantages of an on-off controller with those of pulse width modulation, the noise output associated with the on-off controller being however significantly reduced and it being possible to control the speed of rotation in a stable manner over a wide range. Noise output is diminished by the pulse sequence of the on-off controller being combined with a pulse width modulated signal by means of an AND-element, so that the resulting control signal for a switch element by which the supply voltage is provided to the motor, may have a frequency outside the range of human hearing. The stability of the control is increased by the pulse width of the pulse width modulated signal being dependent on the average torque loading of the motor, while a quick reaction to load fluctuations on the motor is assured by the pulse sequence of the on-off controller.

In an especially preferred embodiment of the method, the pulse width corresponding to the average torque loading of the motor is assured by an average value of the pulse sequence being established and a pulse width generator being controlled by means of this average value in order to generate the pulse width modulated signal. The average value of the pulse sequence provided by the on-off controller represents a measure of the average torque load on the motor. For fixed presetting of the switch-on period for the pulse sequence, the average value is greater according as the switch-off period is shorter, that is the greater the set value deviates from the actual value of the speed of rotation of the motor.

In order to guarantee an especially low noise output, it is advantageous for an operating frequency greater than about 17 kHz to be used for the pulse width modulated signal, in particular an operating frequency of approximately 20 kHz. Preferably, the operating frequency is accordingly above the range of human hearing, so that mechanical vibrations of the direct current motor which occur cannot be heard by the user.

It is also an object of the invention, in order to carry out the method mentioned above, to provide a control unit of the kind mentioned at the beginning, which results in a low level of noise output from the direct current motor and enables a wide and stable control range.

This object is met according to the invention in the case of a control unit of the generic kind by the control unit having a pulse width generator which provides a pulse width modulated signal having a pulse width corresponding to an average torque loading of the motor, and by the control unit including an AND-element for combination of the pulse sequence with the pulse width modulated signal.

As already explained, the use of an on-off controller in combination with a pulse width generator enables reliable control of the speed of rotation, negligible noise output occurring in all cases, the pulse sequence provided by the on-off controller being combined with the pulse width modulated signal generated by the pulse width generator by means of an AND-element.

In order to keep the noise output of the motor controlled as to speed of rotation especially low, it is preferably provided that the operating frequency of the pulse width generator is greater than about 17 kHz, in particular approximately 20 kHz.

In an embodiment of the control unit which can be produced in an economically advantageous manner, it is provided that the control unit comprises an averager, to the input of which the pulse sequence from the on-off controller can be applied and the output of which is connected to the control input of the pulse width generator. By use of the averager, a control voltage is provided to the pulse width generator for pulse width modulation, the control voltage corresponding to the average value of the pulse sequence of the on-off controller and therefore to the average torque loading of the motor. Control instabilities may thereby be inhibited.

The averager is preferably formed as a low-pass filter, the time constant of the low-pass filter being preferably in the range from about 10 to about 500 ms.

For reliable determination of the induction voltage (counter-EMF) present at the armature winding of the separately excited direct current motor during the switch-off period of the pulse sequence, it is advantageous for the on-off controller to comprise a filter element, the input of which may be connected to the motor. By means of a filter element, the induction voltage can be filtered out from the voltage signal present at the motor.

In order to compare the actual value with a set value corresponding to the speed of rotation of the motor, the on-off controller preferably comprises a comparator, which for example may be configured as a differential amplifier.

In order to generate the pulse sequence, the on-off controller may use a monostable multivibrator, by means of which the duration of the switch-on period of the pulse sequence may be preset.

The control unit may be embodied in analog circuitry, but it is also conceivable to form the comparator in particular, the monostable multivibrator, the averager and/or the pulse width generator in digital circuitry, especially in the form of a integrated gate array. Embodiment of the control unit in the form of a micro-controller or a DSP (digital signal processing) unit is especially advantageous, whereby the determination of the signal may be effected by a comparator or also by an analog/digital converter.

The control unit may comprise a separate housing and be formed as an autonomously operable unit. It is especially advantageous for the control unit to be integrated into a decoder unit for electrical model vehicles, in particular vehicles for a model railway, in order to receive and process electrical control signals. A set value for the speed of rotation of the motor may be given to the control unit by way of the decoder unit, and the set value can then be compared in the manner described above with the actual value for control of the speed of rotation.

It is also conceivable for the control unit to be integrated into a model vehicle comprising a separately excited direct current motor.

The following description of a preferred embodiment of the invention serves for more detailed explanation in conjunction with the drawing.

DETAILED DESCRIPTION OF THE INVENTION

Figure 1:
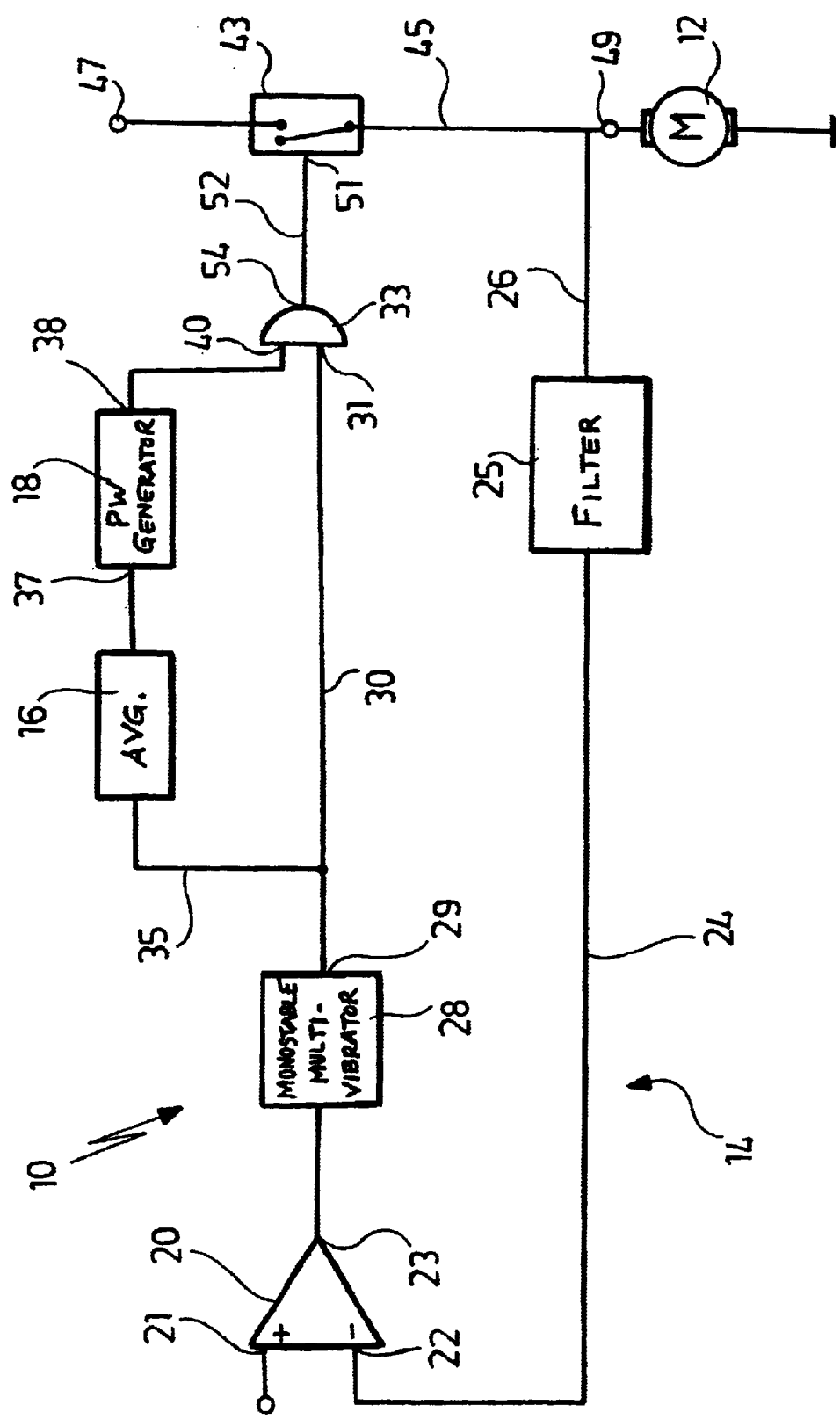
FIG. 1 shows a block circuit diagram of a control unit according to the invention.

In FIG. 1, there is shown in block diagram form, a control unit designated as a whole by the reference sign 10, the control unit being connected to a separately excited direct current motor 12 for a model vehicle, in particular a locomotive of a model railway, and the control unit comprising an on-off controller 14 as well as an averager 16 and a pulse width generator 18.

The on-off controller 14 has a comparator 20 with a set value input 21, an actual value input 22 and an output 23. A set voltage value may be set at the set value input 21, which corresponds to a desired speed of rotation of the motor 12. The actual value input 22 is connected to the output of a filter element 25 of the on-off controller by way of an input line 24, an input of the controller being connected to the motor 12 by a measurement line 26.

The output 23 of the comparator 20 is connected to a monostable multivibrator 28 of the on-off controller 14, the output 29 of which is connected to a first input 31 of an AND-element 33 by an output line 30.

A branch line 35 diverges from the output line 30, the averager being connected in the branch line 35, and the output side of the averager being coupled to a control input 37 of the pulse width generator 18. The output 38 of the pulse width generator 18 is connected to a second input 40 of the AND-element 33.

An electrically controllable switch element 43, for example a switching transistor, is connected in the supply line 45 to the control unit 10, which connects a voltage supply terminal 47 to a motor terminal 49 at which motor 12 is connected. The control input 51 of the switch element 43 is connected to an output 54 of the AND-element 33 by a control line 52.

Figure 2:
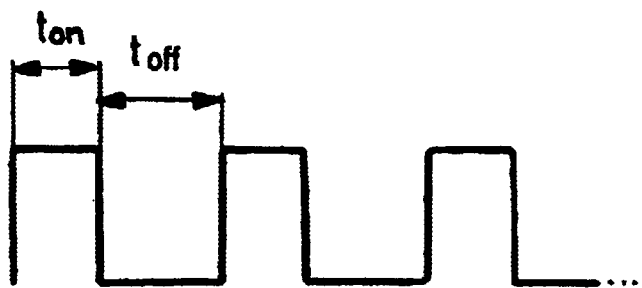
FIG. 2 shows a schematic representation of the output voltage of a monostable multivibrator of the control unit shown in FIG. 1.
Figure 3:
FIG. 3 shows a schematic representation of the output voltage of a pulse width generator of the control unit shown in FIG. 1.
Figure 4:
FIG. 4 shows a schematic representation of the output voltage of an AND-element of the control unit shown in FIG. 1.
Figure 5:
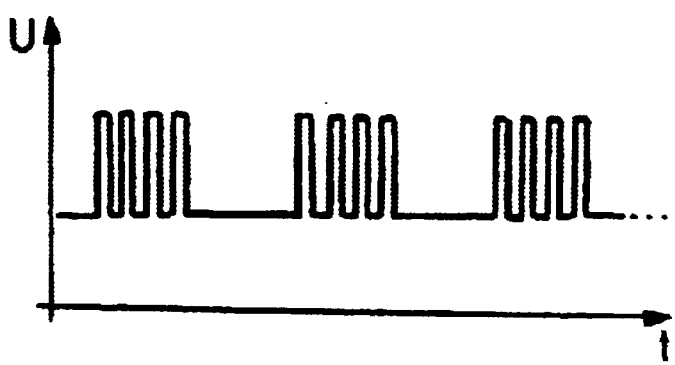
FIG. 5 shows a schematic representation of the voltage present at a motor of the control unit shown in FIG. 1.

The manner of operation of the control unit 10 is clear in particular with reference to FIGS. 2 to 5. In FIG. 2, the temporal course of the voltage present at the output 29 of the monostable multivibrator 28 is schematically represented. FIG. 3 shows the temporal course of the voltage present at the output 38 of the pulse width generator 18, and in FIG. 4, the temporal course of the voltage present at the output 54 of the AND-element 33 is shown. The voltage present at the motor terminal 49 is illustrated in FIG. 5 as to its temporal course.

By means of control unit 10, the motor 12 is supplied in controlled pulse operation with the supply voltage present at the voltage supply terminal 47. For this purpose, the motor is connected to the voltage supply terminal 47 during a switch-on period $t_{on}$, while the motor is disconnected from the voltage supply terminal 47 during the switch-off period $t_{off}$. The motor 12 induces in this way an induction voltage (counter-EMF) on its armature winding, which can be filtered out from the voltage signal present at the motor terminal 49 by means of the filter element 25. This induction voltage is proportional to the speed of rotation of the motor 12 and is applied to the comparator 20 by way of the actual value input 42. The comparator compares the induction voltage with the preset set voltage present at the set value input 21. As long as the actual value corresponds to the set value, the monostable multivibrator 28 remains in its stable condition, so that an OFF signal is present on the output line 30 and on the control line 52, and as a result the switch element 43 is open, that means the supply line 45 is broken. If however the set value or the motor load changes, a difference voltage is provided by the comparator 20 at its output 23, whereby the voltage change from the monostable multivibrator 28 connected therewith is recognized as a starting signal for a voltage pulse of time duration $t_{on}$. Because of the voltage pulse, the switch member 43 is opened and the motor 12 is supplied thereby with the supply voltage. On expiry of the switch-on time $t_{on}$, the voltage supply for the motor 12 is again interrupted. The on-off controller 14 thus provides a pulse sequence with a preset switch-on time $t_{on}$ and with a switch-off time $t_{off}$ dependent on the set value and the motor load. This pulse sequence is not however used directly for control of the switch element 43, but is combined with a pulse width modulated signal shown in FIG. 3 by means of the AND-element 33. The pulse width modulated signal is generated by the pulse width generator 18. Control of the pulse width generator 18 is effected by a signal which is provided by the averager 16, the input of which is connected to the output 29 of the monostable multivibrator 28 by way of the branch line 35. The pulse width of the pulse width modulated signal thus corresponds to the average value over time of the pulse sequence provided by the monostable multivibrator 28. This average value is proportional to the ratio of the switch-on time $t_{on}$ to the sum of the switch-on and switch-off times $t_{on}$ and $t_{off}$ and represents a measure of the average torque loading on the motor 12.

By means of the AND-element 33, the pulse width modulated signal represented in FIG. 3 is combined with the pulse sequence represented in FIG. 2, so that the high frequency signal represented in FIG. 4 is present at the control input 51 of the switch element 43. Since the operating frequency of the pulse width generator 18 is approximately 20 kHz, the control signal present at the control input 51 also displays the corresponding frequency, which is outside the range of human hearing, so that the motor 12 is switched on and off at high frequency and mechanical vibrations which occur can scarcely be heard.

What is claimed is:

1. A method for controlling the speed of rotation of a separately excited direct current motor for model vehicles, the speed of rotation of the motor being controlled by means of a pulse sequence, the motor being alternately supplied with a supply voltage during a switch-on period and disconnected from the supply voltage during a switch-off period, the duration of the switch-off period being dependent on the deviation of an actual value from a set value for the speed of rotation of the motor, wherein:

a pulse width modulated signal is provided, the pulse width of which is dependent on an average torque loading of the motor, the pulse width modulated signal is combined with the pulse sequence to provide a combined signal, and the combined signal is used to control said speed of rotation.

2. The method as claimed in claim 1, wherein an average value of the pulse sequence is formed and a pulse width generator for generating the pulse width modulated signal is controlled by means of this average value.

3. The method as claimed in claim 1, wherein an operating frequency greater than about 17 kHz is used for the pulse width modulated signal.

4. The method as claimed in claim 1, wherein an operating frequency of approximately 20 kHz is used for the pulse width modulated signal.

5. A control unit for controlling the speed of rotation of a separately excited direct current motor for model vehicles, comprising:

an on-off controller providing a pulse sequence for control of a switch element for alternating switch-on and switch-off of the direct current motor, a pulse width generator adapted to provide a pulse width modulated signal with a pulse width corresponding to an average torque loading of the motor, and an AND-element for combining the pulse sequence with the pulse width modulated signal.

6. The control unit as claimed in claim 5, wherein the pulse width generator has an operating frequency of more than about 17 kHz.

7. The control unit as claimed in claim 5, wherein the pulse width generator has an operating frequency of approximately 20 kHz.

8. The control unit as claimed in claim 5, wherein the control unit comprises an averager, to the input of which the pulse sequence is applied and the output of which is connected to a control input of the pulse width generator.

9. The control unit as claimed in claim 8, wherein the averager is configured as a low pass filter.

10. The control unit as claimed in claim 5, wherein the on-off controller comprises a filter element, the input of which is connectable to the motor.

11. The control unit as claimed in claim 5, wherein the on-off controller comprises a comparator for comparison of an actual signal with a preset set value.

12. The control unit as claimed in claim 11, wherein the comparator is configured as a differential amplifier.

13. The control unit as claimed in claim 5, wherein the on-off controller comprises a monostable multivibrator.

14. A decoder unit for receiving and processing electrical control signals to control the speed of rotation of a separately excited direct current motor in an electrical model vehicle, comprising:

a control unit;

said control unit comprising:
- an on-off controller adapted to provide a pulse sequence to control a switch element for alternating switch-on and switch-off of the direct current motor,
- a pulse width generator to provide a pulse width modulated signal with a pulse width corresponding to an average torque loading of the motor, and
- an element for combining the pulse sequence with the pulse width modulated signal.

15. A model vehicle comprising:

a separately excited direct current motor; and a control unit for controlling said motor;

said control unit comprising:
- an on-off controller adapted to provide a pulse sequence to control a switch element for alternating switch-on and switch-off of the direct current motor,
- a pulse width generator to provide a pulse width modulated signal with a pulse width corresponding to an average torque loading of the motor, and
- an element for combining the pulse sequence with the pulse width modulated signal.

* * * * *